(12) United States Patent
Hu

(10) Patent No.: US 7,594,130 B1
(45) Date of Patent: Sep. 22, 2009

(54) CIRCUIT FOR REGULATING TIMING SEQUENCE

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/211,820

(22) Filed: Sep. 17, 2008

(51) Int. Cl.
*G06F 1/26* (2006.01)
*G06F 1/30* (2006.01)

(52) U.S. Cl. .................. 713/300; 713/310; 713/320; 713/330; 323/283

(58) Field of Classification Search ............ 713/300, 713/310, 320, 323, 330; 712/203; 323/283
See application file for complete search history.

(56) References Cited

U.S. PATENT DOCUMENTS

| | | | |
|---|---|---|---|
| 6,732,266 B1 * | 5/2004 | Anderson et al. | 713/100 |
| 6,836,848 B2 * | 12/2004 | Yu et al. | 713/300 |
| 6,874,083 B2 * | 3/2005 | Sarangi et al. | 713/100 |
| 6,920,571 B2 * | 7/2005 | Shaver et al. | 713/310 |
| 7,469,353 B2 * | 12/2008 | Mundada et al. | 713/330 |
| 2002/0073346 A1 * | 6/2002 | Yu et al. | 713/300 |
| 2002/0099925 A1 * | 7/2002 | Chang et al. | 712/203 |
| 2002/0109489 A1 * | 8/2002 | Shaver et al. | 323/283 |
| 2007/0079162 A1 * | 4/2007 | Mundada et al. | 713/330 |

* cited by examiner

*Primary Examiner*—Paul Ip
(74) *Attorney, Agent, or Firm*—Zhigang Ma

(57) ABSTRACT

An exemplary circuit for regulating a timing sequence of a computer includes a PWM chip, a north bridge, a converting circuit, and a CPU. The PWM chip is connected to a power supply via a first resistor, and sends out a PWRGD_VRD signal and three-phase voltage signals. The north bridge outputs a PWRGD_CPU signal according to the PWRGD_VRD signal. The converting circuit transforms the three-phase voltage signals to a Vccp signal. The CPU sends out a VTT_P-WRGD signal based on the PWRGD_CPU signal, and receives the Vccp signal. Wherein the logic level of the PWRGD_VRD signal is pulled up by the resistor, causing the timing sequence of the PWRGD_CPU signal to advance, the timing sequence of the VTT_PWRGD signal is also advanced according to the PWRGD_CPU signal, the timing sequence of the VTT_PWRGD signal is in advance of the timing sequence of the Vccp signal.

7 Claims, 1 Drawing Sheet

CIRCUIT FOR REGULATING TIMING SEQUENCE

BACKGROUND

1. Field of the Disclosure

The present disclosure relates to timing, and particularly to a circuit for regulating a timing sequence of a computer.

2. Description of Related Art

In general, a user can make a computer go into a sleep mode through settings in advanced configuration and power interface (ACPI), in order to protect the computer and save energy. The user can also wake up the sleeping computer by use of a peripheral component, such as a keyboard, a mouse, and etc.

However, sometimes, the user cannot wake up the sleeping computer, since the timing sequence of a terminal voltage power good (VTT_PWRGD) signal sent out from a central processing unit (CPU) does not satisfy a voltage regulation down (VRD) standard, which defines that: when the timing sequence of the VTT_PWRGD signal is in advance of the timing sequence of a CPU core voltage (Vccp) signal received by the CPU, the computer can be woken up normally.

What is needed is to provide a circuit for regulating a timing sequence of a computer which can assure the computer can be woken on demand.

DETAILED DESCRIPTION

Figure 1:
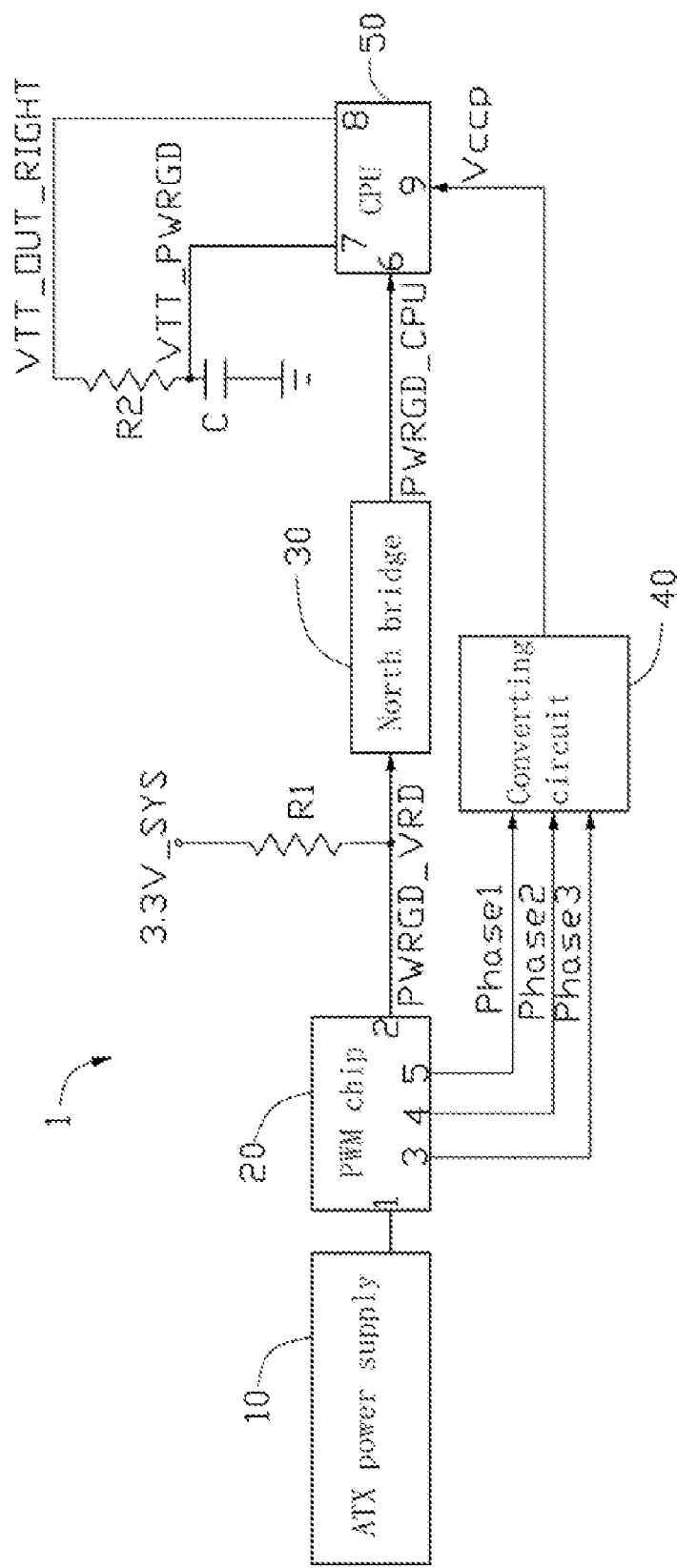
FIG. 1 is a circuit diagram of one embodiment of a circuit for regulating a timing sequence of a computer.

Referring to FIG. 1, one embodiment of a circuit 1 for regulating a timing sequence of a computer includes an advanced technology extended (ATX) power supply 10, a pulse width modulation (PWM) chip 20, a north bridge 30, a converting circuit 40, a central processing unit (CPU) 50, two resistors R1 and R2, and a capacitor C. The PWM chip 20 includes five pins 1-5. The converting circuit 40 includes three input terminals and an output terminal. The CPU 50 includes four pins 6-9. In one embodiment, the resistor R1 is a pull-up resistor, the resistor R2 is a voltage-dividing resistor, the capacitor C is a filtering capacitor. In one embodiment, a resistance value of the first resistor R1 may range from 950Ω to 1050Ω, a resistance value of the second resistor R2 may range from 1.9 kΩ to 2.1Ω, and a capacitance value of the capacitor C1 may range from 0.8 μF to 1.8 μF.

The pin 1 is connected to the ATX power supply 10. The pin 2 is connected to the north bridge 30, and also connected to a 3.3V system power supply 3.3V_SYS via the resistor R1. The pins 3-5 are connected to the three input terminals of the converting circuit 40. The pin 6 is connected to the north bridge 30. The pin 7 is connected to the pin 8 via the resistor R2, and also grounded via the capacitor C. The pin 9 is connected to the output terminal of the converting circuit 40.

The ATX power supply 10 will supply power to the PWM chip 20, after a sleeping computer including the circuit 1 is woken up by use of a peripheral component, such as a keyboard, a mouse, and etc. The pin 2 outputs a voltage regulation down power good (PWRGD_VRD) signal and the pins 3-5 send three-phase voltage signals that includes Phase 1, Phase 2, and Phase 3 to the three corresponding input terminals of the converting circuit 40 respectively. The PWRGD_VRD signal is pulled up by the resistor R1, then transmitted to the north bridge 30. The north bridge 30 sends a CPU power good (PWRGD_CPU) signal to the CPU 50, after receiving the PWRGD_VRD signal. The pin 7 outputs a termination voltage power good (VTT_PWRGD) signal, and the pin 8 outputs an out right termination voltage (VTT_OUT_RIGHT) signal, after the CPU 50 receives the PWRGD_CPU signal. The converting circuit 40 transforms the three-phase voltage signals to a CPU core voltage (Vccp) signal, and transmits the Vccp signal to the pin 9.

Because the PWRGD_VRD signal is pulled up by the resistor R1, the logic level of the PWRGD_VRD signal rises, causing the timing sequence of the PWRGD_CPU signal to advance, which correspondingly advances the timing sequence of the VTT_PWRGD signal, and the timing sequence of the VTT_PWRGD signal is in advanced of the timing sequence of the Vccp signal by 50 ms-200 ms, it satisfying the VRD standard, and the computer can be quickly woken.

It is to be understood, however, that even though numerous characteristics and advantages of the present disclosure have been set forth in the foregoing description, together with details of the structure and function of the present disclosure, the disclosure is illustrative only, and changes may be made in details, especially in matters of shape, size, and arrangement of parts within the principles of the present disclosure to the full extent indicated by the broad general meaning of the terms in which the appended claims are expressed.

What is claimed is:

1. A circuit for regulating a timing sequence of a computer, comprising:
    a pulse width modulation (PWM) chip comprising an input terminal configured for being connected to a first power supply, and an output terminal connected to a second power supply via a first resistor, the PWM chip capable of sending out a voltage regulation down power good (PWRGD_VRD) signal and three-phase voltage signals, upon a condition that the first power supply supplies power to the PWM chip;
    a north bridge configured for sending out a central processing unit (CPU) power good (PWRGD_CPU) signal according to the PWRGD_VRD signal;
    a converting circuit capable of transforming the three-phase voltage signals to a CPU core voltage (Vccp) signal; and
    a CPU arranged and configured for sending out a termination voltage power good (VTT_PWRGD) signal based on the PWRGD_CPU signal received from the north bridge, and receiving the Vccp signal from the converting circuit;
    wherein the logic level of the PWRGD_VRD signal is pulled up by the first resistor, causing the timing sequence of the PWRGD_CPU signal to advance, wherein the timing sequence of the VTT_PWRGD signal is advanced according to the PWRGD_CPU signal, and wherein the timing sequence of the VTT_PWRGD signal is in advance of the timing sequence of the Vccp signal.

2. The circuit of claim 1, wherein the CPU comprises a first pin to send out the VTT_PWRGD signal and a second pin, the first pin is grounded via a capacitor, and is connected to the second pin via a second resistor.

3. The circuit of claim 2, wherein the resistance of the second resistor ranges from about 1.9 kΩ to 2.1 kΩ, and the capacitance of the capacitor C1 ranges from about 0.8 μF to 1.8 μF.

4. The circuit of claim 2, wherein the second pin of the CPU outputs an out right termination voltage signal.

5. The circuit of claim 1, wherein the resistance of the first resistor ranges from about 950Ω to 1050Ω.

6. The circuit of claim 1, wherein the timing sequence of the VTT_PWRGD signal is advanced of the timing sequence of the Vccp signal by 50 ms-200 ms.

7. The circuit of claim 1, wherein the second power supply is a 3.3V system power supply.

* * * * *